United States Patent
Ito (10) Patent No.: US 9,455,657 B2
(45) Date of Patent: Sep. 27, 2016

(54) ALTERNATOR CONTROL APPARATUS

(71) Applicant: Takahiro Ito, Toyota (JP)

(72) Inventor: Takahiro Ito, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/440,220

(22) PCT Filed: Nov. 9, 2012

(86) PCT No.: PCT/JP2012/079186
§ 371 (c)(1),
(2) Date: May 1, 2015

(87) PCT Pub. No.: WO2014/073097
PCT Pub. Date: May 15, 2014

(65) Prior Publication Data
US 2015/0303853 A1    Oct. 22, 2015

(51) Int. Cl.
| H02P 9/00 | (2006.01) |
| H02P 9/08 | (2006.01) |
| H02J 7/16 | (2006.01) |
| H02P 9/48 | (2006.01) |
| H02P 101/45 | (2015.01) |
| F02N 11/08 | (2006.01) |

(52) U.S. Cl.
CPC . *H02P 9/08* (2013.01); *H02J 7/16* (2013.01); *H02P 9/48* (2013.01); *F02N 11/0848* (2013.01); *H02P 2101/45* (2015.01)

(58) Field of Classification Search
CPC .............. H02J 7/16; H02P 9/48; H02P 9/08; H02P 9/04; H02P 2101/45; F02N 9/08
USPC .............. 322/20, 44, 59, 24; 290/40 B, 40 R
See application file for complete search history.

(56) References Cited

U.S. PATENT DOCUMENTS

| 6,396,165 | B1 * | 5/2002 | Nagano ..................... B60K 6/42 290/40 R |
| 6,787,931 | B2 * | 9/2004 | Nakagawa .............. F02N 11/04 290/31 |
| 6,984,957 | B2 * | 1/2006 | Tajima ..................... B60K 6/26 318/400.02 |
| 7,342,382 | B1 | 3/2008 | Blackburn et al. |
| 2004/0061461 | A1 * | 4/2004 | Tajima ..................... B60K 6/26 318/400.02 |
| 2004/0237510 | A1 * | 12/2004 | Kusada .................. B60K 6/485 60/285 |

FOREIGN PATENT DOCUMENTS

| EP | 0751602 A2 | 1/1997 |
| JP | S61-171879 A | 8/1986 |
| JP | 2010-263720 A | 11/2010 |

* cited by examiner

*Primary Examiner* — Julio Cesar Gonzalez Ramirez
(74) *Attorney, Agent, or Firm* — Kenyon & Kenyon LLP (57) ABSTRACT

An alternator control apparatus is provided which includes a first controller and a second controller that periodically transmits an instruction signal related to electric power generation to the first controller, wherein the instruction signal selectively includes a power generation instruction signal and a non-power generation instruction signal, the first controller, if a detection value of power supply voltage is less than a threshold and receives the power generation instruction signal from the second controller, controls a power generation amount of the alternator to be greater than a predetermined reference, and, if the detection value is less than the threshold and receives the non-power generation instruction signal from the second controller, forms or maintains the non-power generated or the power generation suppressed state, the second controller periodically transmits the non-power generation instruction signal to the first controller until a predetermined condition is met after completion of engine start.

6 Claims, 6 Drawing Sheets

ALTERNATOR CONTROL APPARATUS

CROSS-REFERENCE TO RELATED APPLICATION

This is a national phase application based on the PCT International Patent Application No. PCT/JP2012/079186 filed Nov. 9, 2012, the entire contents of which are incorporated herein by reference.

TECHNICAL FIELD

The present invention is related to an alternator control apparatus that controls an alternator.

BACKGROUND ART

A power generation control device for a vehicle is known which stops a release operation of suppression of power generation by a generator for the vehicle when receiving a key-on signal sent from an external controller, and then restarts the release operation of the suppression of the power generation when the control device detects a state where the power generation suppression signal indicating the suppression of the power generation is not sent from the external controller (see Patent Document 1). According to the power generation control device for a vehicle, the release operation of the suppression of the power generation is, restarted after a predetermined time lapses from the detection of the state where the power generation suppression signal indicating the suppression of the power generation is not sent from the external controller.

[Patent Document 1] Japanese Laid-open Patent Publication No. 2010-263720

DISCLOSURE OF INVENTION

Problem to be Solved by Invention

According to such a configuration disclosed in Patent Document 1 described above in which an alternator is controlled in cooperation by two controllers (the external controller and the power generation control device for a vehicle) that are connected via a communication bus, the slave controller (the power generation control device for a vehicle) has a function (priority charge function) of controlling the alternator such that the power generation amount of the alternator is greater than a predetermined reference (the power generation amount of the alternator becomes its maximum, for example) if a detection value of a power supply voltage (battery voltage) becomes smaller than a predetermined threshold.

The power supply voltage is temporarily decreased due to an operation of a starter at a time of an engine start; however, if the priority charge function operates accordingly at that timing, there is a problem that a sudden increase in a torque of the alternator causes an engine start characteristic to becomes worse (the engine rpm does not easily increase, which increases a time required for a transition to a complete explosion).

For this reason, such a configuration may be contemplated in which, at the time of the engine start, the master controller (the external controller) transmits a non-power generation instruction signal to the slave controller so as not to cause the priority charge function to operate. The non-power generation instruction signal is one of limited instruction signals, among various control signals to be transmitted from the master controller, that has a higher priority with respect to the priority charge function. When the slave controller receives the non-power generation instruction signal, the slave controller does not implement the priority charge function even if the detection value of the power supply voltage is less than the predetermined threshold.

However, if the non-power generation instruction signal is stopped after the determination of the engine complete explosion (at the time of the starter off), the priority charge function may operate at that time if the power supply voltage is not sufficiently restored at that time. If the priority charge function operates after the engine start, there may be a problem that an undesired decrease in the engine rpm or an engine stall occurs.

According to the configuration disclosed in Patent Document 1, the suppression of the power generation is performed until the transition of the engine to the complete explosion, which can prevent the engine start characteristic from becoming worse, but may not prevent the decrease in the engine rpm or the engine stall after the engine start. Further, according to the configuration disclosed in Patent Document 1, it becomes necessary to equip the power generation control device for a vehicle, which is the slave controller, with a special function including a determination function of the lapse of the predetermined time, etc.

Therefore, an object of the present invention is to provide a alternator control apparatus that is capable of reducing a probability of the decrease in the engine rpm or the engine stall after the engine start without equipping a slave controller with such a special function.

Means to Solve the Problem

According to an aspect of the present invention, an alternator control apparatus is provided which includes: a first controller that controls an alternator; and a second controller that periodically transmits an instruction signal to the first controller, the instruction signal being related to electric power generation of the alternator, wherein the instruction signal selectively includes a power generation instruction signal that causes a power generated state of the alternator, and a non-power generation instruction signal that causes a non-power generated state or a power generation suppressed state of the alternator, the first controller, if a detection value of a power supply voltage is less than a predetermined threshold and the first controller receives the power generation instruction signal from the second controller, controls a power generation amount of the alternator such that the power generation amount is greater than a predetermined reference, and, if the detection value of the power supply voltage is less than the predetermined threshold and the first controller receives the non-power generation instruction signal from the second controller, forms or maintains the non-power generated state or the power generation suppressed state of the alternator according to the non-power generation instruction signal, the second controller periodically transmits the non-power generation instruction signal to the first controller until a predetermined condition is met after a completion of an engine start.

Advantage Of The Invention

According to the present invention, a alternator control apparatus can be obtained that is capable of reducing a probability of the decrease in the engine rpm or the engine stall after the engine start without equipping a slave controller with such a special function.

BEST MODE FOR CARRYING OUT THE INVENTION

10 ECU
20 LIN regulator
30 LIN bus
40 battery
50 electrical load
52 starter
60 alternator

BEST MODE FOR CARRYING OUT THE INVENTION

In the following, the best mode for carrying out the present invention will be described in detail by referring to the accompanying drawings.

Figure 1:
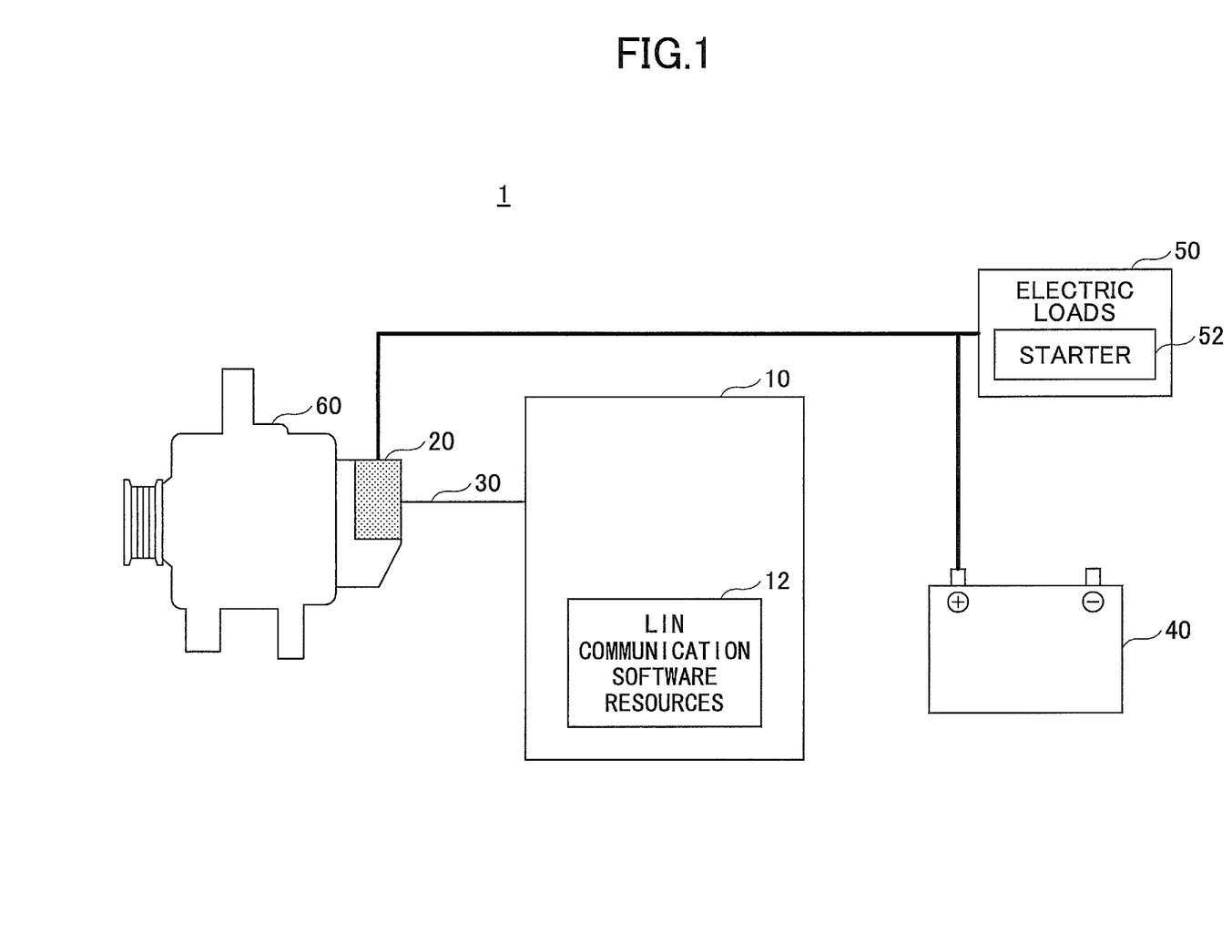
FIG. 1 is a diagram illustrating a main configuration of an alternator control apparatus 1, according to an embodiment.

FIG. 1 is a diagram illustrating a main configuration of an alternator control apparatus 1 according to an embodiment. The alternator control apparatus 1 controls an alternator 60. It is noted that the alternator 60 is coupled to an engine (not illustrated) and generates electric power based on rotation of the engine. The electric power generated by the alternator 60 is consumed by electrical loads 50 of the vehicle. The electrical loads 50 are various, and include a starter 52, a blower motor, a wiper motor, etc. Further, the electric power generated by the alternator 60 may be utilized to charge a battery 40 installed in the vehicle.

The alternator control apparatus 1 includes an ECU (Electronic Control Unit) 10 and an LIN (Local Interconnect Network) regulator 20, as illustrated in FIG. 1. The ECU 10 and the LIN regulator 20 are connected via a LIN bus (LIN communication bus) 30. The ECU 10 and the LIN regulator 20 communicate with each other based on a LIN protocol. The LIN protocol is of a master/slave type in which the ECU 10 functions as a master and the LIN regulator 20 functions as a slave. It is noted that another slave controller, in addition to the LIN regulator 20, may be connected to the ECU 10.

The ECU 10 may include a microprocessor that includes a CPU, a ROM, a RAM, etc., which are interconnected via buses (not illustrated). A storage device 12 such as a ROM has LIN communication software resources stored therein. It is noted that the ECU 10 may be implemented by an arbitrary ECU such as an ECU that controls an engine. It is noted that the function of the ECU 10 may be implemented by plural ECUs in cooperation.

The ECU 10 generates an instruction signal related to electric power generation by the alternator 60, and transmits the generated instruction signal to the LIN regulator 20 via the LIN bus 30. The instruction signal related to electric power generation by the alternator 60 may be any types of signals that identify a target value with respect to an amount of the electric power generated by the alternator 60. For example, the instruction signal may identify the target value of an output voltage (power generation voltage) or a power generation duty of the alternator 60. The ECU 10 transmits the instruction signal to the LIN regulator 20 at intervals of a predetermined period T1 in a normal scheduling state.

The instruction signal selectively includes a power generation instruction signal that causes a power generated state of the alternator 60, and a non-power generation instruction signal that causes a non-power generated state of the alternator 60. The non-power generation instruction signal is generated for forming a state (the non-power generated state of the alternator 60) in which no excitation current flows through an exciting coil of the alternator 60. The non-power generation instruction signal may have an instruction value "0" for the output voltage of the alternator 60. On the other hand, the power generation instruction is generated for forming a state (the power generated state of the alternator 60) in which the excitation current flows through the exciting coil of the alternator 60. The power generation instruction signal may have an instruction value other than "0" for the output voltage of the alternator 60.

It is noted that the instruction signal may include, in addition to the instruction value (target value) for the output voltage (power generation voltage) of the alternator 60, an instruction value related to an increase gradient (including an upper limit value, etc.) of the output voltage (power generation voltage) of the alternator 60, an instruction value related to the excitation current for the alternator 60, etc.

The ECU 10 obtains information identifying an ON/OFF state of the starter 52. The ECU 10 determines, based on a starter ON signal, engine start timing (timing of starting an engine starting operation). For example, the ECU 10 determines that the engine starting operation is started, if the starter ON signal is generated. It is noted that the ECU 10 may determine the engine start timing based on other information (an ignition ON signal, etc.), instead of or in addition to the starter ON signal. It the ECU 10 determines that the engine starting operation is started, the ECU 10 transmits the non-power generation instruction signal to the LIN regulator 20 at intervals of the predetermined period T1.

The ECU 10 obtains information (a complete explosion flag) of determination result (complete explosion determination) identifying a transition to a state of a complete explosion of the engine, or information identifying the ON/OFF state of the starter 52. The ECU 10 detects engine starting operation completion timing based on these items of the information. For example, the ECU 10 determines that the engine starting operation is completed, if the complete explosion flag is set and the starter OFF signal is detected. It is noted that the ECU 10 may determine the engine starting operation completion timing based on only the complete explosion flag or the starter OFF signal, or may determine the engine starting operation completion timing based on other information, instead of or in addition to these items of the information. It is noted that an operation of the ECU 10 at the engine starting operation completion timing is described hereinafter with reference to FIG. 3.

The LIN regulator 20 may be formed by an IC (Integrated Circuit). Preferably, the LIN regulator 20 may have a specification which Verband der Deutschen Automobilindustrie (VDA) promotes to unify. For example, the LIN regulator 20 may be a TLE8880 commercially produced by Infineon and a CR665 commercially produced by Bosch, etc., that meet such a regulator specification. The LIN regulator 20 may be incorporated in a body of the alternator 60, as schematically illustrated in FIG. 1.

The LIN regulator 20 is connected to the battery 40. The LIN regulator 20 has a function of detecting a voltage (power supply voltage) of the battery 40. The LIN regulator 20 detects the power supply voltage at intervals of a predetermined period. The predetermined period may be equal to the predetermined period T1.

The LIN regulator 20 receives the instruction signal from the ECU 10 via the LIN bus 30. Further, the LIN regulator 20 transmits a detection value of the power supply voltage to the ECU 10 via the LIN bus 30 at intervals of a predetermined period. The predetermined period may be equal to the predetermined period T1. For example, the LIN regulator 20 transmits to the ECU 10 the detection value of the power supply voltage as a reply signal (response value) in response to the instruction signal from the ECU 10.

If the LIN regulator 20 receives the power generation instruction signal from the ECU 10, the LIN regulator 20 controls the alternator 60 such that the instruction value (a target value of the power generation voltage, for example) of the power generation instruction signal is implemented. For example, the LIN regulator 20 determines an excitation current drive duty (power generation duty) to be applied to the exciting coil of the alternator 60 such that the instruction value of the power generation instruction signal is implemented. The LIN regulator 20 may include a gradual exciting function of gradually changing the power generation duty. When the LIN regulator 20 implements the gradual exciting function, the LIN regulator 20 gradually increases the power generation duty toward a value of the power generation duty corresponding the instruction value of the power generation instruction signal. It is noted that, at that time, the LIN regulator 20 may determine the increasing gradient for the power generation duty according to the instruction value related to the increasing gradient that may be included in the instruction signal.

If the LIN regulator 20 receives the non-power generation instruction signal from the ECU 10, the LIN regulator 20 sets the excitation current to be applied to the exciting coil of the alternator 60 to "0" (i.e., sets the power generation duty to 0%).

The LIN regulator 20 has a priority charge function of controlling the alternator 60 such that the power generation amount thereof becomes greater than a predetermined reference value if the detection value of the power supply voltage becomes less than a predetermined priority charge triggering threshold. For example, the LIN regulator 20 controls the alternator 60 such that the alternator 60 operates in its maximum power generation capability if the detection value of the power supply voltage becomes less than the predetermined priority charge triggering threshold. In other words, the LIN regulator 20 does not implement the gradual exciting function, and instantaneously sets the power generation duty of the alternator 60 to the maximum duty (i.e., 100%). According to the priority charge function, the power supply capability of the alternator 60 for the electrical loads 50 is instantaneously increased (thus the power supply voltage is restored quickly), which prevents undesired operations or the like of the electrical loads 50 due to the decrease in the power supply voltage even in states where the battery 40 excessively discharges, an internal resistance of the battery 40 becomes greater due to the degradation of the battery 40, there is a contact failure in the battery 40, etc.

It is noted that, the predetermined priority charge triggering threshold may correspond to a tolerable minimum value of the power supply voltage that can keep a normal operation of the electrical loads 50, or a value that has a margin with respect to the tolerable minimum value.

The priority charge function of the LIN regulator 20 does not operate, if the LIN regulator receives the non-power generation instruction signal. In other words, in a situation where the non-power generation instruction signal is transmitted from the ECU 10 to the LIN regulator 20, the priority charge function does not operate even if the detection value of the power supply voltage becomes less than the predetermined priority charge triggering threshold. On the other hand, the priority charge function of the LIN regulator 20 is not prevented by other instruction signals (the power generation instruction signal, for example) from the ECU 10. Thus, in a situation where the power generation instruction signal is transmitted to the LIN regulator 20 from the ECU 10, the priority charge function works if the detection value of the power supply voltage becomes less than the predetermined priority charge triggering threshold. In this case, the power generation control of the alternator 60 is performed based on the priority charge function, regardless of the instruction value of the power generation instruction signal. In this way, the LIN regulator is configured such that the priority charge function is not triggered only in a state in which the LIN regulator 20 receives the non-power generation instruction signal. It is noted that such a configuration (logic related to a relationship, etc., between the non-power generation instruction signal and the priority charge function) is already incorporated in the LIN regulator 20 that complies with a regulator specification which Verband der Deutschen Automobilindustrie (VDA) promotes to unify.

Figure 2:
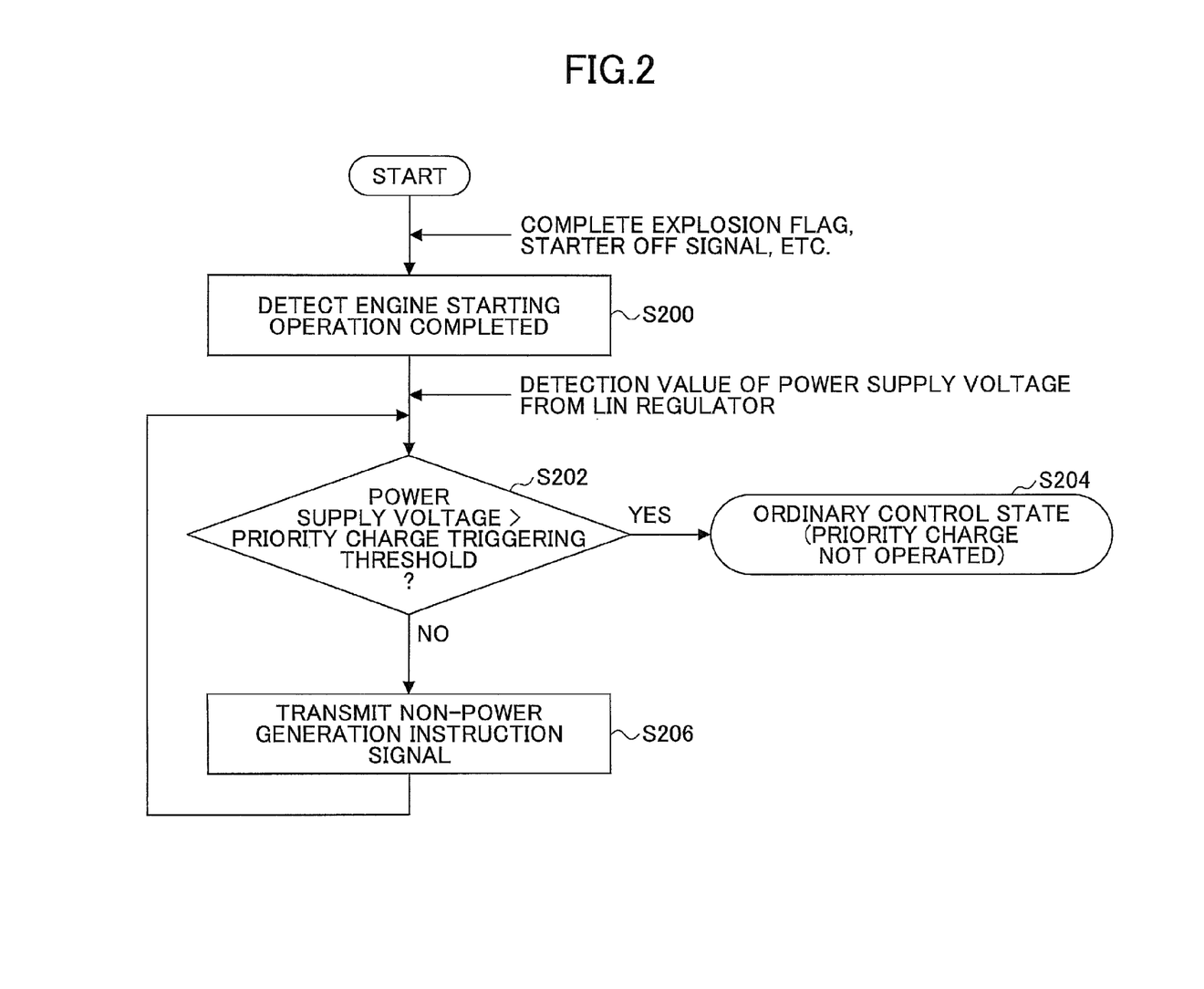
FIG. 2 is an example of a flowchart of a main process executed by an ECU 10 in connection with engine starting operation completion timing.

FIG. 2 is an example of a flowchart of a main process executed by the ECU 10 in connection with the engine starting operation completion timing. The process illustrated in FIG. 2 may be implemented when the CPU of the ECU 10 executes the LIN communication software resources. The process illustrated in FIG. 2 is executed after the engine starting operation is started, and thus the ECU 10 transmits the non-power generation instruction signal to the LIN regulator 20 at the time of starting the process illustrated in FIG. 2, as described above. Thus, the alternator 60 is in the non-power generated state.

In step S200, the ECU 10 detects, based on the complete explosion flag or the starter OFF signal, for example, the engine starting operation completion timing.

In step S202, the ECU 10 determines, based on the detection value (the latest value) of the voltage of the battery 40 (i.e., the power supply voltage) obtained from the LIN regulator 20 via the LIN bus 30, whether the detection value of the power supply voltage is greater than the priority charge triggering threshold. If the detection value of the power supply voltage is greater than the priority charge triggering threshold, the process goes to step S204. If the detection value of the power supply voltage is less than the priority charge triggering threshold, the process goes to step S206. It is noted that, when the detection value of the power supply voltage is equal to the priority charge triggering threshold, the process may go to step S204 or step S206 (depending on a way of setting the priority charge triggering threshold).

In step S204, the ECU 10 stops the transmission of the non-power generation instruction signal to the LIN regulator 20 to start the transmission of the power generation instruction signal, which leads to an ordinary control state. It is noted that a target value of the power generation instruction signal related to the power generation amount of the alternator 60 may be determined in an arbitrary manner. In general, the power generation voltage of the alternator 60 is controlled optimally according to a vehicle travel state. For example, in order to reduce a load on the engine due to the power generation by the alternator 60, the power generation voltage is reduced in an idling state of the vehicle or a travel state with constant speed, and the power generation voltage is increased in a decelerating state of the vehicle. Further, in an accelerating state of the vehicle, the power generation voltage of the alternator 60 may be adjusted such that an accumulated value of an input/output current of the battery 40 follows a predetermined target value.

In the ordinary control state, when the ECU 10 determines the target value related to the power generation amount of the alternator 60 as described above, the ECU 10 transmits the instruction signal, which identifies the target value, to the LIN regulator 20 via the LIN bus 30 at intervals of the predetermined period T1. Typically, the instruction signal at that time is not the non-power generation instruction signal, and thus causes the state of the alternator 60 to change from the non-power generated state to the power generated state.

In step S206, the ECU 10 continues to transmit the non-power generation instruction signal to the LIN regulator 20, and then the process returns to step S202. In this way, the ECU 10 transmits the non-power generation instruction signal to the LIN regulator 20 at the time of the engine starting operation, and continues to transmit the non-power generation instruction signal to the LIN regulator 20 until the detection value of the power supply voltage becomes greater than the priority charge triggering threshold after the completion of the engine starting operation.

If the transmission of the non-power generation instruction signal is stopped immediately after the completion of the engine starting operation, the priority charge function operates immediately after the stop of the transmission of the non-power generation instruction signal, which may lead to a problem that an undesired decrease in the engine rpm or an engine stall occurs. In contrast, according to the process illustrated in FIG. 2, the transmission of the non-power generation instruction signal is not stopped immediately after the completion of the engine starting operation, but the transmission of the non-power generation instruction signal is stopped after the detection value of the power supply voltage becomes greater than the priority charge triggering threshold. Therefore, it becomes possible to reduce the probability that the undesired decrease in the engine rpm or the engine stall occurs after the completion of the engine starting operation (after the determination of the engine complete explosion).

It is noted that, according to the process illustrated in FIG. 2, the detection of the engine starting operation completion timing causes the ECU 10 to start to determines whether the detection value of the power supply voltage is greater than the priority charge triggering threshold (step S202); however, the ECU 10 may determine whether the detection value of the power supply voltage is greater than the priority charge triggering threshold before the engine starting operation completion timing. In this case, if the detection value of the power supply voltage becomes greater than the priority charge triggering threshold before the engine starting operation completion, the ordinary control state may be implemented at that timing.

Figure 3:
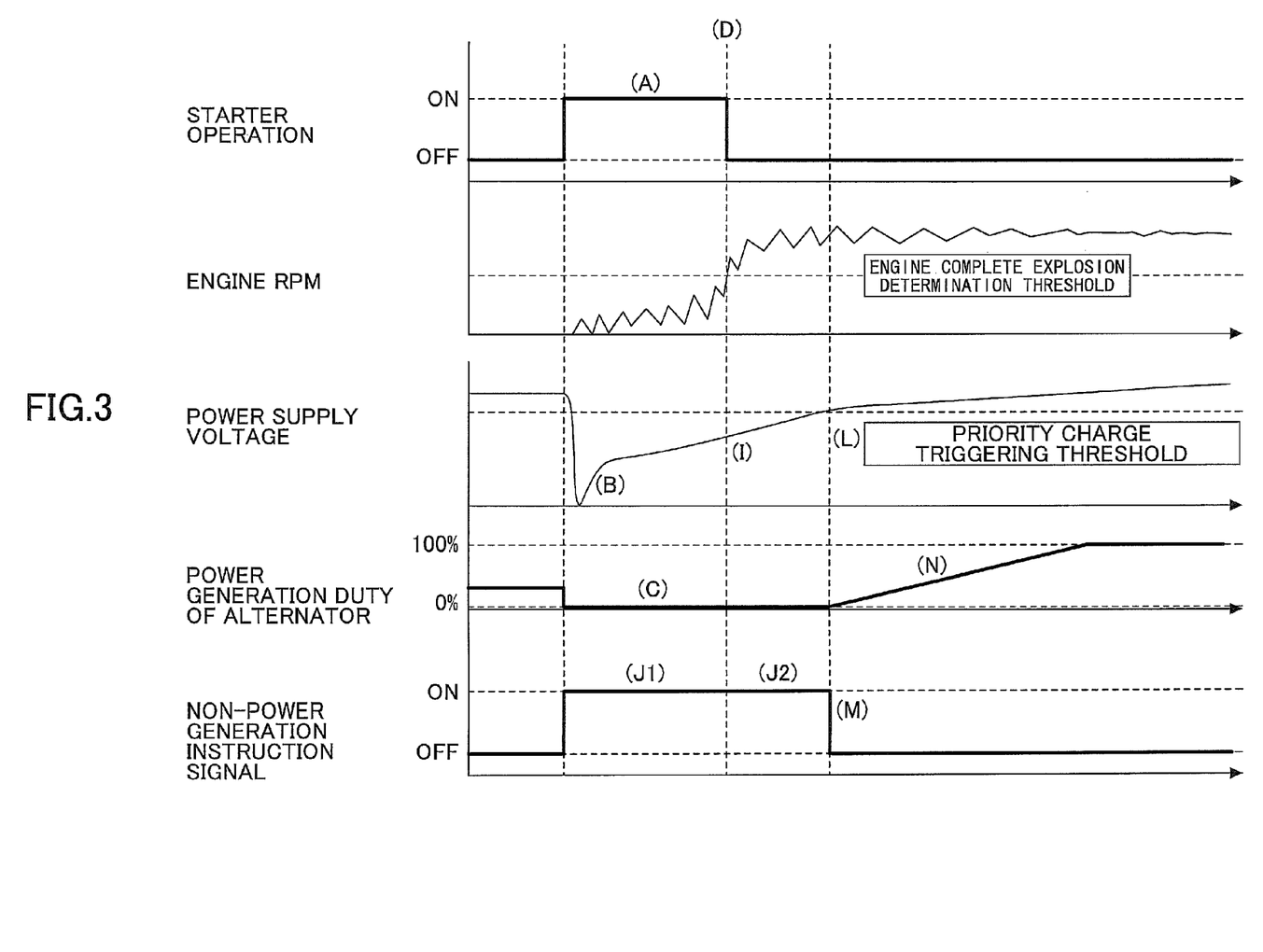
FIG. 3 is a diagram illustrating an example of time series of various states implemented according to the embodiment.

FIG. 3 is a diagram illustrating an example of time series of various states implemented according to the embodiment, in which, from the upper side, an operation state (ON/OFF state) of the starter 52, a state of the engine rpm, a state of the power supply voltage, a state of the power generation duty of the alternator 60, and a state (ON/OFF state) of the non-power generation instruction signal are illustrated. It is noted that, with respect to the time series of the engine rpm, an engine complete explosion determination threshold at which the complete explosion flag is set is illustrated by a dotted line. Further, with respect to the time series of the power supply voltage, the priority charge triggering threshold is illustrated by a dotted line. Further, the ON state of the non-power generation instruction signal corresponds to a state where the transmission of the non-power generation instruction signal to the LIN regulator 20 is performed, and the OFF state of the non-power generation instruction signal corresponds to a state where the transmission of the non-power generation instruction signal to the LIN regulator 20 is stopped (i.e., where the transmission of the power generation instruction signal to the LIN regulator 20 is performed).

With reference to FIG. 3, when the ignition switch is turned on, the power generation duty of the alternator 60 is increased to a predetermined value in response to the power generation instruction signal from the ECU 10. After that, the starter starts to operate (see (A) in FIG. 3), the power supply voltage temporarily decreases due to the consumption of the power from the battery 40 (see (B) in FIG. 3). Further, the transmission of the non-power generation instruction signal is performed (see (J1) in FIG. 3) as described above in order to increase a startability after the start of the operation of the starter 52 (i.e., at the time of cranking). As a result of this, during the operation of the starter 52, the power generation duty of the alternator 60 is 0% (see (C) in FIG. 3), which increases the engine startability. When the engine rpm reaches the engine complete explosion determination threshold (see (D) in FIG. 3), the starter 52 is turned off. At that timing, because the power supply voltage is less than the priority charge triggering threshold (see (I) in FIG. 3), the transmission of the non-power generation instruction signal to the LIN regulator 20 is continued (see (J2) in FIG. 3). As a result of this, the power generation duty of the alternator 60 is kept at 0, and the operation of the priority charge function immediately after the completion of the engine starting operation is prevented (see (K) in FIG. 3). The temporary consumption of the power from the battery 40 ends and thus the power supply voltage restores so that the power supply voltage becomes greater than the priority charge triggering threshold (see (L) in FIG. 3), which causes the transmission of the non-power generation instruction signal to be stopped at that timing (see (M) in FIG. 3). Thus, at that timing, the priority charge function is not operated even if the transmission of the non-power generation instruction signal is stopped. After that, the transmission of the power generation instruction signal causes the power generation duty of the alternator 60 to gradually increase (due to the gradual exciting function) (see (N) in FIG. 3), a gentle increase in the load torque of the alternator after the completion of the engine starting operation is implemented. In this way, according to the embodiment, the operation of the priority charge function is prevented after the completion of the engine starting operation (after the determination of the engine complete explosion), and the probability that the undesired decrease in the engine rpm or the engine stall occurs is reduced.

It is noted that, in the example illustrated in FIG. 3, the transmission of the non-power generation instruction signal is started at the start timing of the operation of the starter 52; however, the start timing of the transmission of the non-power generation instruction signal is arbitrary as long as the startability is not extremely decreased. For example, the transmission of the non-power generation instruction signal may be started at the timing of the ignition switch ON event, or as soon as possible after the timing of the start-up of the ECU 10, or may be started after the start of the operation of the starter 52.

Figure 4:
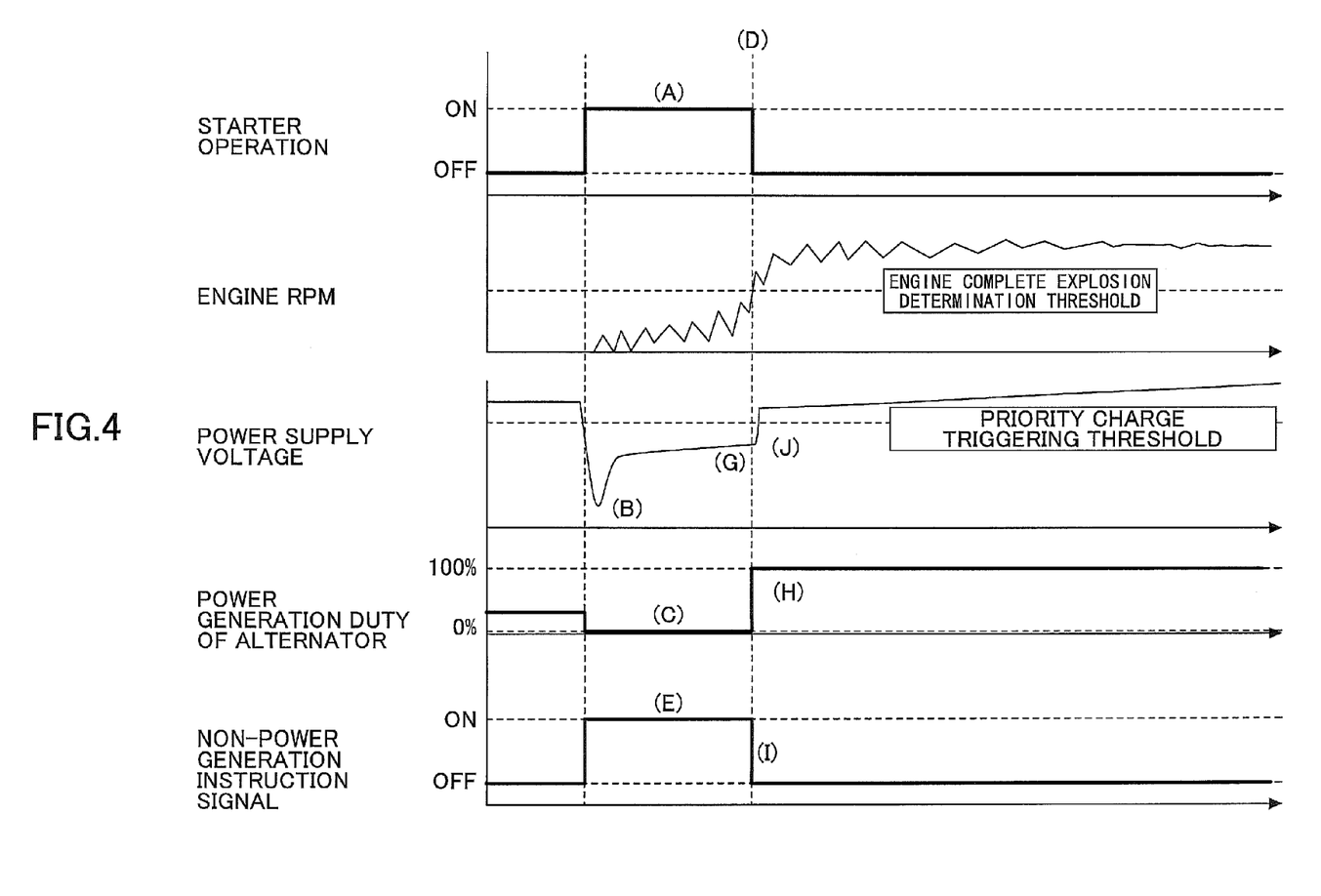
FIG. 4 is a diagram illustrating an example of time series of various states implemented according to a comparative embodiment.

FIG. 4 is a diagram for contrast to FIG. 3 and illustrating an example of time series of various states implemented according to a comparative embodiment. According to the comparative embodiment, the transmission of the non-power generation instruction signal is stopped immediately after the completion of the engine starting operation.

Similarly, according to the comparative embodiment, as illustrated in FIG. 4, when the ignition switch is turned on, the power generation duty of the alternator 60 is increased to the predetermined value in response to the power generation instruction signal from the ECU 10. After that, the starter starts to operate (see (A) in FIG. 4), and the power supply voltage temporarily decreases due to the consumption of the power from the battery 40 (see (B) in FIG. 4). Further, the transmission of the non-power generation instruction signal is performed after the time of starting the operation of the starter 52 in order to increase the startability (see (E) in FIG. 4). As a result of this, during the operation of the starter 52, the power generation duty of the alternator 60 is 0% (see (C) in FIG. 4), which increases the engine startability. When the engine rpm reaches the engine complete explosion determination threshold (see (D) in FIG. 4), the starter 52 is turned off. At the same time, according to the comparative embodiment, the transmission of the non-power generation instruction signal is stopped (see (I) in FIG. 4). At that time (when the starter 52 is turned off), the power supply voltage is less than the priority charge triggering threshold (see (G) in FIG. 4). Therefore, when the transmission of the non-power generation instruction signal is stopped, the priority charge function starts to operate immediately (see (H) in FIG. 4). In other words, the power generation duty of the alternator 60 is instantaneously increased to 100%, which causes the significant power generation. Accordingly, although the power supply voltage is restored (see (J) in FIG. 4), the significant increase in the power generation leads to the increased load on the engine, which causes the decrease in the engine rpm, the engine stall, etc.

It is noted that, even in the comparative embodiment, if the power supply voltage is greater than the priority charge triggering threshold when the starter 52 is turned off, the priority charge function does not operate even if the transmission of the non-power generation instruction signal is stopped, and thus there is no problem related to the decrease in the engine rpm, the engine stall, etc. However, because the starter 52 consumes the massive electric power for a short term, there may be a case where the power supply voltage becomes less than the priority charge triggering threshold when the starter 52 is turned off. In such a case, the problem occurs.

Figure 5:
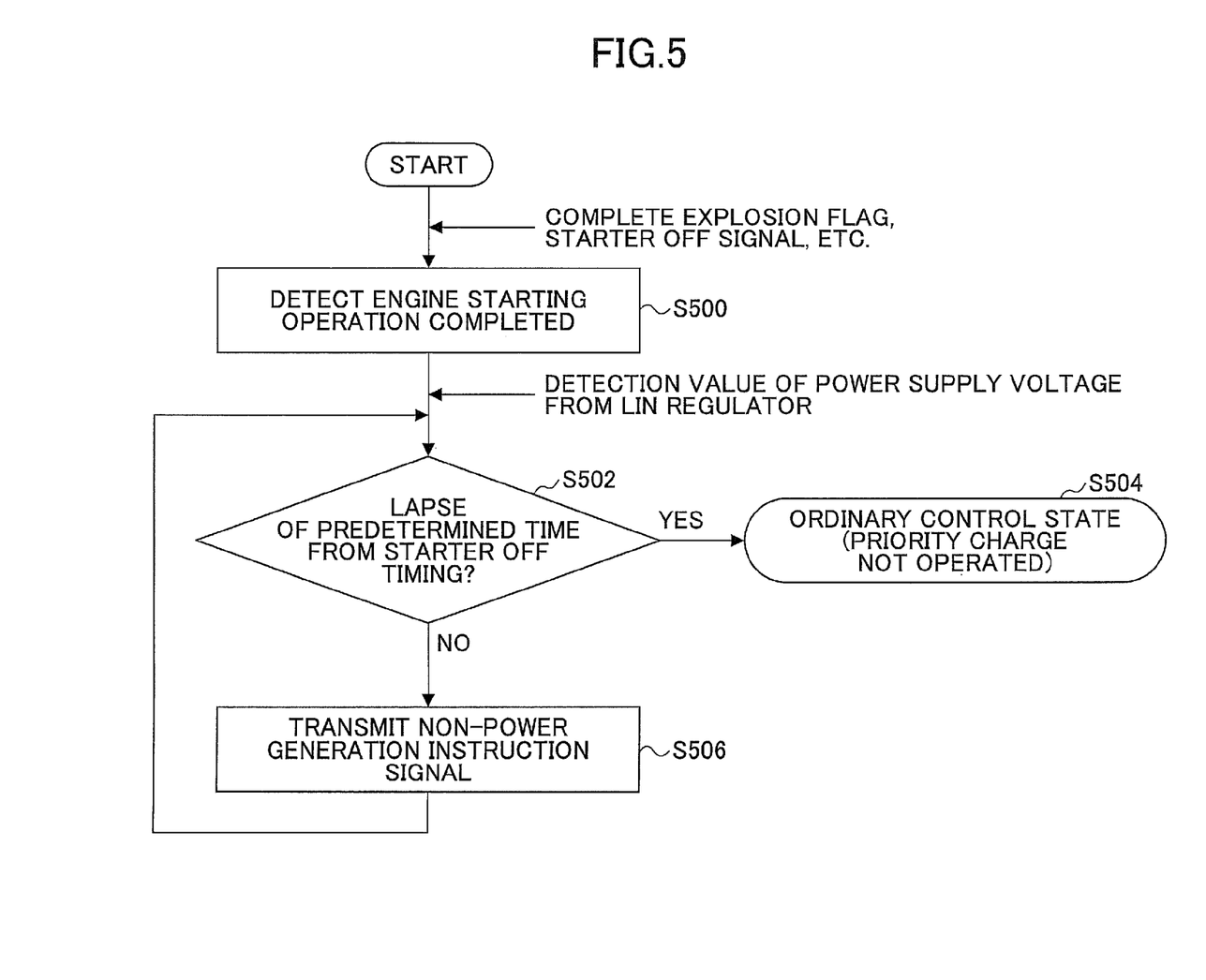
FIG. 5 is another example of a flowchart of a main process executed by an ECU 10 in connection with the engine starting operation completion timing.

FIG. 5 is another example of a flowchart of a main process executed by the ECU 10 in connection with the engine starting operation completion timing. The process illustrated in FIG. 5 may be implemented when the CPU of the ECU 10 executes the LIN communication software resources.

Similar to the process illustrated in FIG. 2, the process illustrated in FIG. 5 is executed after the engine starting operation is started, and thus the ECU 10 transmits the non-power generation instruction signal to the LIN regulator 20 at the time of starting the process illustrated in FIG. 5, as described above. Thus, the alternator 60 is in the non-power generated state.

The processes of step S500, S504 and S506 may be the same as step S200, S204 and S206 illustrated in FIG. 2, respectively.

In step S502, the ECU 10 determines whether a predetermined time lapses from the time when the starter 52 is turned off. If the predetermined time lapses from the time when the starter 52 is turned off, the process goes to step S504, otherwise the process goes to step S506. The predetermined time may be set in an arbitrary manner. The predetermined time may be adapted by experiments, etc., such that the predetermined time corresponds to a time from the timing when the starter 52 is turned off to the timing when the power supply voltage becomes greater than the priority charge triggering threshold. It is noted that, because the time from the timing when the starter 52 is turned off to the timing when the power supply voltage becomes greater than the priority charge triggering threshold is not constant, an average value thereof or the like obtained from the experiments, etc., may be used.

According to the process illustrated in FIG. 5, the transmission of the non-power generation instruction signal is not stopped immediately after the completion of the engine starting operation, but the transmission of the non-power generation instruction signal is stopped after a lapse of the predetermined time from the timing when the starter 52 is turned off. Therefore, it becomes possible to reduce the probability that the undesired decrease in the engine rpm or the engine stall occurs after the completion of the engine starting operation (after the determination of the engine complete explosion). However, according to the process illustrated in FIG. 5, even if the power supply voltage is greater than the priority charge triggering threshold at the timing when the starter 52 is turned off, the power generation of the alternator 60 is not started. This is a disadvantageous point of the process illustrated in FIG. 5 with respect to the process illustrated in FIG. 2. Further, according to the process illustrated in FIG. 5, if the power supply voltage is still less than the priority charge triggering threshold at the timing when the predetermined time lapses from the OFF event of the starter 52, the priority charge function operates, which may cause the undesired decrease in the engine rpm or the engine stall. This is another disadvantageous point of the process illustrated in FIG. 5 with respect to the process illustrated in FIG. 2. However, according to the process illustrated in FIG. 5, even if the priority charge function thus operates, the timing when the priority charge function starts to operate is later than that in the comparative embodiment (see FIG. 4), which means that the probability of the undesired decrease in the engine rpm or the engine stall is decreased with respect to the comparative embodiment.

It is noted that, according to the process illustrated in FIG. 5, the time is measured from the timing when the starter 52 is turned off; however, the timing of stating the timer may be set at another equivalent time point. For example, in such a configuration in which there is a difference between the timing of the OFF event of the starter and the timing of the complete explosion determination, the timer may be started at the timing of the complete explosion determination (i.e., when the complete explosion is set). In this case, the predetermined time as a threshold may be changed accordingly.

Figure 6:
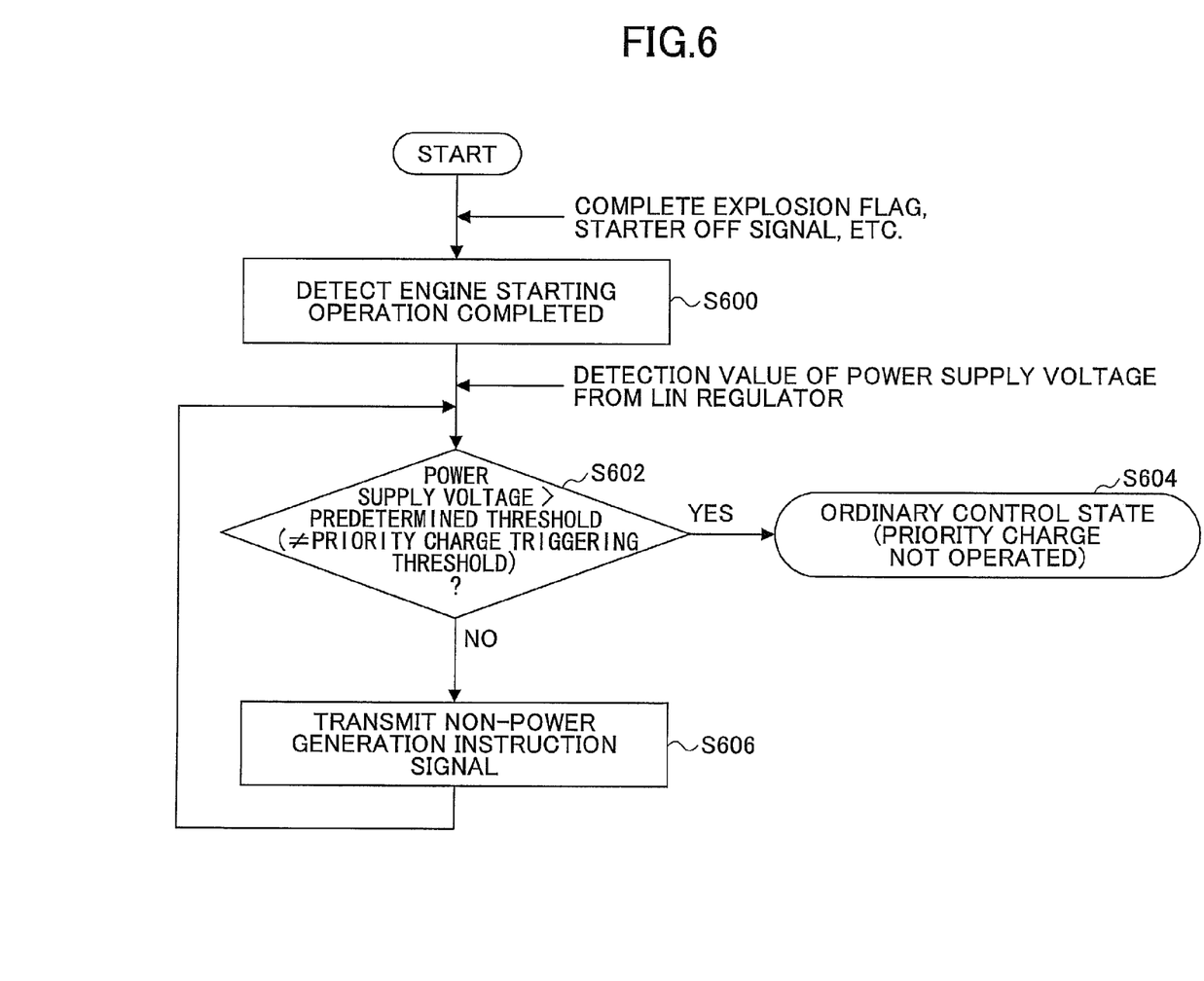
FIG. 6 is further another example of a flowchart of a main process executed by an ECU 10 in connection with the engine starting operation completion timing.

FIG. 6 is further another example of a flowchart of a main process executed by the ECU 10 in connection with the engine starting operation completion timing. The process illustrated in FIG. 6 may be implemented when the CPU of the ECU 10 executes the LIN communication software resources. Similar to the predetermined illustrated in FIG. 2, the process illustrated in FIG. 6 is executed after the engine starting operation is started, and thus the ECU 10 transmits the non-power generation instruction signal to the LIN regulator 20 at the time of starting the process illustrated in FIG. 6, as described above. Thus, the alternator 60 is in the non-power generated state.

The processes of step S600, S604 and S606 may be the same as step S200, S204 and S206 illustrated in FIG. 2, respectively.

In step S602, the ECU 10 determines, based on the detection value (the latest value) of the voltage of the battery 40 (i.e., the power supply voltage) obtained from the LIN regulator 20 via the LIN bus 30, whether the detection value of the power supply voltage is greater than a predetermined threshold. If the detection value of the power supply voltage is greater than the predetermined threshold, the process goes to step S604. If the detection value of the power supply voltage is less than the predetermined threshold, the process goes to step S606. It is noted that, when the detection value of the power supply voltage is equal to the predetermined threshold, the process may go to step S604 or step S606 (depending on a way of setting the predetermined threshold).

The predetermined threshold is set such that the predetermined threshold is different from the priority charge triggering threshold. If the predetermined threshold is greater than the priority charge triggering threshold, there is a disadvantage in that the start timing of the power generation of the alternator 60 is delayed. Thus, preferably, the predetermined threshold is set such that the predetermined threshold is slightly greater than the priority charge triggering threshold. However, the predetermined threshold may be set such that the predetermined threshold is less than the priority charge triggering threshold. In this case, when the transmission of the non-power generation instruction signal is stopped, the priority charge function may operate and thus the undesired decrease in the engine rpm or the engine stall, etc., may occur. This is a disadvantageous point of the process illustrated in FIG. 5 with respect to the process illustrated in FIG. 2. However, even in this case, the timing when the priority charge function may start to operate is later than that in the comparative embodiment (see FIG. 4), which means that the probability of the undesired decrease in the engine rpm or the engine stall is decreased with respect to the comparative embodiment.

According to the alternator control apparatus 1 of this embodiment, the following effect among others can be obtained.

As described above, the transmission of the non-power generation instruction signal is not stopped immediately after the completion of the engine starting operation, but the transmission of the non-power generation instruction signal is continued until a predetermined condition is met. Therefore, it becomes possible to reduce the probability that the undesired decrease in the engine rpm or the engine stall occurs after the completion of the engine starting operation (after the determination of the engine complete explosion).

Further, according to the embodiment, only by appropriately setting the transmission term of the non-power generation instruction signal from the ECU 10 (the transmission stop timing after the completion of the engine starting operation, in particular), the probability that the undesired decrease in the engine rpm or the engine stall occurs after the completion of the engine starting operation can be reduced. Therefore, it becomes possible to reduce the probability that the undesired decrease in the engine rpm or the engine stall occurs after the completion of the engine starting operation, while using the existing function of the LIN regulator 20 that complies with the regulator specification for which Verband der Deutschen Automobilindustrie (VDA) promotes to unify and thus has high versatility. In other words, by effectively utilizing the logic that is incorporated in the LIN regulator 20 that complies with the regulator specification for which Verband der Deutschen Automobilindustrie (VDA) promotes to unify (i.e., by effectively utilizing the non-power generation instruction signal that has a higher priority with respect to the priority charge function), it becomes possible, without changing the regulator specification, to reduce the probability that the undesired decrease in the engine rpm or the engine stall occurs after the completion of the engine starting operation.

The present invention is disclosed with reference to the preferred embodiments. However, it should be understood that the present invention is not limited to the above-described embodiments, and variations and modifications may be made without departing from the scope of the present invention.

For example, according to the embodiment described above, the OFF timing of the starter 52 is the same as the timing of the complete explosion determination (i.e., the starter 52 is turned off at the timing of the complete explosion determination); however, there may be a difference between the OFF timing of the starter 52 and the timing of the complete explosion determination. In this case, the process of step S202 in illustrated in FIG. 2 (also the process of step S502 in illustrated in FIG. 5 and the process of step S602 in illustrated in FIG. 6), for example, may be started at either the OFF timing of the starter 52 or the timing of the complete explosion determination.

Further, according to the logic that is incorporated in the LIN regulator 20 that complies with the regulator specification for which Verband der Deutschen Automobilindustrie (VDA) promotes to unify, the non-power generation instruction signal, which is only the signal that has a higher priority with respect to the priority charge function, causes the LIN regulator 20 to form the non-power generated state of the alternator 60; however, by a possible change in the regulator specification in the future, the non-power generation instruction signal may include a signal that causes the LIN regulator 20 to form a power generation suppressed state of the alternator 60 (in which the power generation of the alternator 60 is suppressed with respect to the state in which the priority charge function operates). Further, the name "non-power generation instruction signal" is used for the sake of the explanation, and the name may be arbitrary. It is noted that, according to the current regulator specification, the "non-power generation instruction signal" is an instruction signal that includes an instruction value "0X00".

The invention claimed is:

1. An alternator control apparatus; comprising:
a first controller that controls an alternator; and
a second controller that periodically transmits an instruction signal to the first controller, the instruction signal being related to electric power generation of the alternator, wherein
the instruction signal selectively includes a power generation instruction signal that causes a power generated state of the alternator, and a non-power generation instruction signal that causes a non-power generated state or a power generation suppressed state of the alternator,
the first controller, if a detection value of a power supply voltage is less than a predetermined threshold and the first controller receives the power generation instruction signal from the second controller, controls a power generation amount of the alternator such that the power generation amount is greater than a predetermined reference, and, if the detection value of the power supply voltage is less than the predetermined threshold and the first controller receives the non-power generation instruction signal from the second controller, forms or maintains the non-power generated state or the power generation suppressed state of the alternator according to the non-power generation instruction signal,
the second controller periodically transmits the non-power generation instruction signal to the first controller until the detection value of the power supply voltage becomes greater than or equal to the predetermined threshold after a completion of an engine start.

2. The alternator control apparatus of claim 1, wherein the second controller starts a transmission of the non-power generation instruction signal at or before timing of an operation of a starter, and periodically transmits the non-power generation instruction signal until the predetermined condition is met.

3. The alternator control apparatus of claim 1, wherein timing after the completion of the engine start is after timing of determining that a state of an engine is changed to a state of a complete explosion.

4. The alternator control apparatus of claim 1, wherein the first controller, if the detection value of the power supply voltage is less than the predetermined threshold and the first controller receives the power generation instruction signal from the second controller, controls the alternator with a maximum power generation duty regardless of the power generation instruction signal.

5. The alternator control apparatus of claim 1, wherein the first controller is a regulator that complies with a LIN (Local Interconnect Network) protocol, and the first controller and the second controller communicate with each other based on the LIN protocol.

6. A controller that periodically transmits an instruction signal to a regulator that controls an alternator, the instruction signal being related to electric power generation of the alternator, the instruction signal selectively including a power generation instruction signal that causes a power generated state of the alternator, and a non-power generation instruction signal that causes a non-power generated state or a power generation suppressed state of the alternator, the regulator, if a detection value of a power supply voltage is less than a predetermined threshold and the regulator receives the power generation instruction signal from the controller, controls alternator with a maximum power generation duty regardless of the power generation instruction signal, and, if the detection value of the power supply voltage is less than the predetermined threshold and the regulator receives the non-power generation instruction signal from the controller, forms or maintains the non-power generated state or the power generation suppressed state of the alternator according to the non-power generation instruction signal, wherein
the controller periodically transmits the non-power generation instruction signal to the regulator until the detection value of the power supply voltage becomes greater than or equal to the predetermined threshold after a completion of an engine start.

* * * * *